No. 873,864. PATENTED DEC. 17, 1907.
W. H. HOWARD.
ANIMAL TRAP.
APPLICATION FILED SEPT. 24, 1907.
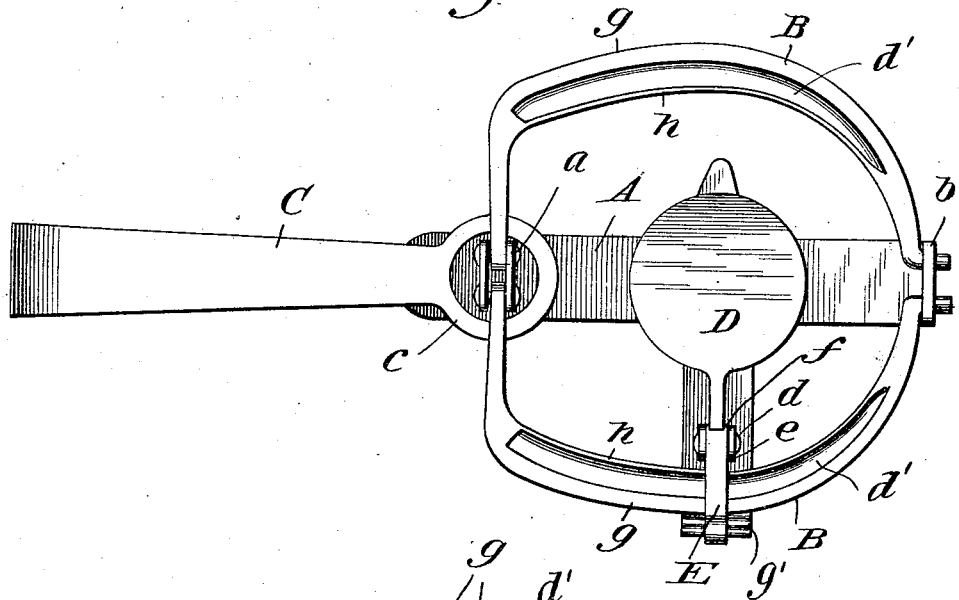
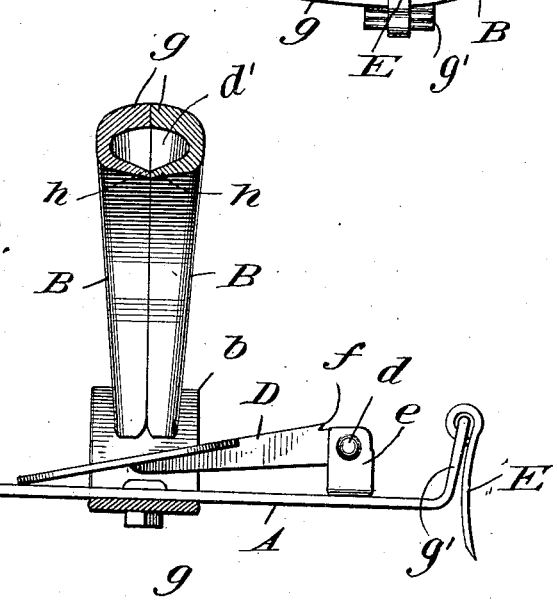
Inventor
W. H. Howard

UNITED STATES PATENT OFFICE.

WILLIAM H. HOWARD, OF NEW CANTON, ILLINOIS.

ANIMAL-TRAP.

No. 873,864.    Specification of Letters Patent.    Patented Dec. 17, 1907.

Application filed September 24, 1907. Serial No. 394,345.

*To all whom it may concern:*

Be it known that I, WILLIAM H. HOWARD, citizen of the United States, residing at New Canton, in the county of Pike and State of Illinois, have invented new and useful Improvements in Animal-Traps, of which the following is a specification.

My invention pertains to animal traps and more particularly to the jaws thereof; and its novelty, utility and practical advantages will be fully understood from the following description and claim when the same are read in connection with the drawings accompanying and forming part of this specification, in which:

Figure 1 is a plan view illustrating a trap embodying my invention as open or set. Fig. 2 is a transverse section of the trap as the same appears when closed. Fig. 3 is an enlarged transverse section illustrative of the jaws of the trap.

Similar letters designate corresponding parts in all of the views of the drawings, referring to which:

A is the base of the trap, which is provided with the usual upturned end portions $a$ and $b$. B B are jaws pivoted at their ends to the said portions $a$ and $b$ of the base. C is a loop spring having an eye $c$ positioned to receive the straight rear arms of the jaws B. D is a trigger-platform, pivoted at $d$ to a standard $e$ on base A and having a lip $f$, and E is a latch pivoted to an upturned portion $g'$ of the base A and having its free end beveled to engage the lip $f$ of the trigger platform D. These parts, with the exception of the jaws B, are of the ordinary, well known construction and are designed to operate in the usual manner—that is to say, the jaws B are opened to the position shown in Fig. 1 against the action of the spring C, and are retained in such position by the latch E resting over one of the jaws, Fig. 1, and engaged with the lip $f$ of the trigger platform D. Then when an animal steps upon the trigger platform D and releases the latch E, the jaws B are thrown upward and held together by the spring C to catch and hold the leg of the animal.

The jaws B are peculiar in that they are channeled at their inner sides, as indicated by $d'$; the channels being gradually diminished in width though not in depth toward the forward ends of the jaws, this in order to render the forward portions of the jaws very strong and enable the same to meet the tendency of a trapped animal to pull forward or away from the point at which the trap is fastened. The said jaws B are also peculiar in that their upper or outer portions $g$ are comparatively thick and have square meeting faces so as to enable them to take secure hold of an animal's leg without breaking the skin, while their lower or inner portions $h$ are thin and are inclined slightly downward and inward, as best shown in Fig. 3. By virtue of this latter provision, it will be apparent that the lower or inner portions $h$ will sink into an animal's leg when the same is first caught and by so doing will prevent a slip before the jaws are embedded in opposite sides of the leg.

It is well known that when an animal resorts to gnawing the caught member with a view of disengaging itself from the trap, it always gnaws the portions under the jaws, but when my improved jaws are employed it will be apparent that such effort at release will be without avail inasmuch as the portions of the leg in the channels of the jaws and the portions clamped between the upper or outer portions $g$ of the jaws will preclude release of the animal from the jaws.

As will be gathered from the foregoing jaws constructed in accordance with my invention are adapted to be used in large traps as well as in traps of the type illustrated; also, that the said jaws are almost if not quite as easy to produce and cheap as the ordinary jaws at present in general use.

Having described my invention, what I claim and desire to secure by Letters-Patent, is:

An animal trap having jaws channeled at their inner sides; the said channels being gradually diminished in width toward the forward ends of the jaws, and also having the upper or outer portions of the jaws comparatively thick and equipped with square meeting faces, and the lower or inner portions of the jaws thin and inclined downward and inward.

In testimony whereof I have hereunto set my hand in presence of two subscribing witnesses.

WILLIAM H. HOWARD.

Witnesses:
CHARLES PFRIMAN,
J. R. EASLEY.